United States Patent
Eddy et al.

(10) Patent No.: US 10,435,295 B2
(45) Date of Patent: Oct. 8, 2019

(54) COUPLING AN ELECTRIC FURNACE WITH A LIQUID FUEL SYNTHESIS PROCESS TO IMPROVE PERFORMANCE WHEN PROCESSING HETEROGENEOUS WASTES

(71) Applicants: Thomas L Eddy, Naples, FL (US);
Brian D Raivo, Idaho Falls, ID (US)

(72) Inventors: Thomas L Eddy, Naples, FL (US);
Brian D Raivo, Idaho Falls, ID (US)

( * ) Notice: Subject to any disclaimer, the term of this patent is extended or adjusted under 35 U.S.C. 154(b) by 180 days.

(21) Appl. No.: 15/366,600

(22) Filed: Dec. 1, 2016

(65) Prior Publication Data
US 2018/0155190 A1    Jun. 7, 2018

(51) Int. Cl.
*C01B 3/34*    (2006.01)
*C10G 2/00*    (2006.01)

(52) U.S. Cl.
CPC ............. *C01B 3/34* (2013.01); *C10G 2/32* (2013.01); *C01B 2203/0216* (2013.01); *C01B 2203/0222* (2013.01); *C01B 2203/062* (2013.01); *C01B 2203/085* (2013.01); *C01B 2203/0861* (2013.01); *C10G 2300/4081* (2013.01); *Y02E 50/32* (2013.01)

(58) Field of Classification Search
CPC ........................................................ C02F 3/02
See application file for complete search history.

(56) References Cited

U.S. PATENT DOCUMENTS

| | | | | |
|---|---|---|---|---|
| 5,541,386 A * | 7/1996 | Alvi | .......... | A62D 3/19 110/236 |
| 5,666,891 A * | 9/1997 | Titus | .......... | A62D 3/19 110/250 |
| 6,204,427 B1 * | 3/2001 | Eddy | .......... | F23G 5/085 110/346 |
| 8,237,006 B2 * | 8/2012 | Stone | .......... | C10J 3/00 588/321 |
| 8,764,875 B2 * | 7/2014 | Huang | .......... | C01B 3/50 585/240 |
| 2008/0182298 A1 * | 7/2008 | Day | .......... | C01B 3/22 435/72 |
| 2013/0333288 A1 * | 12/2013 | Richley | .......... | C10K 3/003 48/113 |
| 2014/0175335 A1 * | 6/2014 | Anderson | .......... | C10J 3/18 252/373 |
| 2016/0023928 A1 * | 1/2016 | Chung | .......... | B09B 3/00 71/9 |

* cited by examiner

Primary Examiner — Nina Bhat (57) ABSTRACT

An improved method for processing heterogeneous municipal solid waste, biomass and even construction and demolition waste into liquid hydrocarbon fuels and chemicals is obtained by coupling the synthesis process with an electric furnace. The furnace separates the metals and inorganics from the organic materials. The high temperatures gasify the organics into a relatively clean syngas after particulate and acid gas removal. The yield is increased above that expected from the feedstock by the addition of waste effluents from the synthesis process, such as CO2, H2O and possibly tail gas constituents. The recycled effluents are heated by the syngas being quenched in heat exchangers. Excess high pressure effluents are also heated by the syngas for power generation via gas or steam turbine generators. The optimum concentration of added effluents and heat exchanger configurations are determined by novel methods for maximum yield, energy efficiency and minimum carbon footprint.

13 Claims, 4 Drawing Sheets

Electric furnace in submerged arc furnace (SAF) configuration.

Figure 1. Electric furnace in submerged arc furnace (SAF) configuration.

Figure 2. Typical arrangement of SAF, heat exchangers and turbines to optimize yield with a simplified Fischer-Tropsch synthesis and refinery component system.

Figure 3. Drawing of 500 tonne/day of MSW SAF feed system, electric furnace, gasifier and duct to heat exchangers. Dual electrode movement range shown.

END-ON VIEW OF MTI-200 INSTALLATION

POWER SUPPL., FAN & BAGHOUSE

OFFGAS DUCTS, SCRUB FILTERS, BURNER

FEEDER, MELTER, SP. QUENCH, PACKED BED

MELTER, ELECTRODES, SCRUBBER SYSTEMS

AUTOMATIC TAPPING OF GLASS-CERAMIC

Figure 4. Photographs of an electric furnace SAF facility used for testing.

COUPLING AN ELECTRIC FURNACE WITH A LIQUID FUEL SYNTHESIS PROCESS TO IMPROVE PERFORMANCE WHEN PROCESSING HETEROGENEOUS WASTES

CROSS-REFERENCE TO RELATED APPLICATIONS

This application claims the benefit of U.S. provisional application Ser. No. 62/266,582 filed Dec. 12, 2015, the disclosure of which is hereby incorporated in its entirety by reference herein.

FEDERALLY SPONSORED RESEARCH

None

SEQUENCE LISTING

None

BACKGROUND

Prior Art—U.S. Patents

Prior Patents Indicating Recycling from Synthesis Unit to a Partial Oxidation Gasifier, Reformer, Autothermal Reformer, or Equivalent.

Chang, et al. (U.S. Pat. No. 4,138,442; 1979) starts with a syngas from fossil fuels that is converted by catalyst to a mix of methanol and DME. The DME is converted with a zeolite catalyst to product containing gasoline and a light hydrocarbon gas fraction. The latter could be liquefied, releasing a hydrogen gas that could be recycled to the fossil fuel conversion or otherwise used.

Iijima (U.S. Pat. No. 6,489,370; 2002) uses steam mixed with natural gas to generate a syngas in a reformer heated by radiation from a separate combustion unit. Carbon dioxide from the combustion unit is added to the steam-natural gas mixture into the reformer to generate more carbon monoxide. The unit acts as a partial oxidation reformer, but with indirect heating so that air can be used as the oxidant.

Thiebaut (U.S. Pat. No. 6,846,951; 2005) recycles 5-50% of the carbon dioxide from a reformer and fed with a natural gas feedstock and oxygen into an autothermal reformer in a process to make methanol and acetic acid.

Fenouil, et al. (U.S. Pat. No. 7,250,450; 2007) uses a gaseous hydrocarbon feedstock in a partial oxidation process to make a syngas fed to a catalytic converter. The resulting hydrocarbon products are separated from a recycle stream. Carbon dioxide is then separated out from the recycle stream before recycling the carbon dioxide depleted stream into the partial oxidation unit.

Gueh (U.S. Pat. No. 8,513,316; 2013) presents ideas of mixing carbonaceous feedstock with recycled carbon dioxide and tail gas from FT synthesis to feed a thermal conversion plant or a chemical conversion plant to generate a syngas. The thermal conversion plant consists of a molten metal bath heated externally. The ideas are not supported by any data or details on how to accomplish the proposed methods.

Ravikumar, et al. (U.S. Pat. No. 8,629,188; 2014) proposes a gas to liquids plant in which energy for natural gas reformation is provided at least in part by biomass (shale oil) gasification. A hydrocarbon feed stream is provided to a reformer and a second biomass feed stream partially oxidized. The latter is partly fed to a burner for the reformer energy and then the balance combined with the first feed stream to be synthesized in a Fischer-Tropsch process or equivalent into a liquid fuel product. Carbon dioxide in the product stream is redirected to the reformer. The water effluent is separated into a waste water that is combined with the first feed stream and into a purge stream, a portion of which is fed to a turbine to generate power, the exhaust energy of which is recycled to the reformer.

Blevins, et al. (U.S. Pat. No. 8,936,769; 2015) produce a syngas from a mix of steam and carbonaceous material in a reformer. A catalytic conversion unit then generates a hydrocarbon product stream from which a tail gas is separated of carbon monoxide, carbon dioxide, hydrogen and methane. Tail gas options include possible fluid flows to various system components such as a mixing apparatus, a reformer, and/or catalytic synthesis conversion unit.

Prior Patents Indicating Recycling from a Synthesis Unit Back to a Synthesis Unit (a Common Way to Increase the Carbon Conversion Efficiency for a Given Catalyst) or Equivalent.

Janda (U.S. Pat. No. 6,444,712; 2002) proposes a methanol synthesis unit and a hydrocarbon synthesis unit to generate methanol and hydrocarbon products from natural gas. Carbon dioxide from the hydrocarbon synthesis unit is separated out and mixed with natural gas to obtain a optimal syngas composition to the separate methanol synthesis unit.

Price (U.S. Pat. No. 6,740,683; 2004) synthesizes chemicals from syngas. Uses hydrogen-poor hydrocarbons with $H_2/CO<2$, but recycles vapor product from the FT synthesis process to obtain $2<H_2/CO<3$ (a typical FT synthesis recycle technique).

Early (U.S. Pat. No. 7,790,775; 2010) presents complex methods of recycling syngas and FT synthesis products streams to the synthesis process to increase carbon conversion efficiency.

Severinsky (Patents U.S. Pat. No. 7,641,292; 2010, U.S. Pat. No. 8,114,916; 2012 and U.S. Pat. No. 8,168,143; 2012) presents methods of recycling syngas and FT synthesis products streams to the synthesis processes to increase carbon conversion efficiency.

Menzel (U.S. Pat. No. 8,741,971 B2; 2014) discusses a method and system for operating a Fischer-Tropsch synthesis from coal gasification for production of feed gas of CO and hydrogen. The gas is desulphurized and fed to the Fischer-Tropsch system for the production of liquid products. The CO and CO2 gas exiting the FT process is compressed and fed to a convertoer stage in which the CO is converted with steam into H2 and CO2. The CO2 is subsequently removed and the H2 enriched gas is recycled along with primary de-sulphurized gas back to the FT process. Advantage is seen in reduced de-sulphurizing costs and increased H2 content of the gas entering the FT plant.

Prior Patents Indicating a Separation but No Recycling for Synthesis, or Equivalent.

Bohn, et al. (U.S. Pat. No. 6,306,917; 2001) use a partial oxidation process to generate a syngas from a hydrocarbon feedstock. After FT synthesis, the CO2 is separated out as a product (not recycled to system) and the remaining hydrogen rich tail gas used in a gas turbine to generate power.

Prior Patents Using External Sources of Carbon Dioxide

Shiroto, et al. (U.S. Pat. No. 6,656,978; 2003 and U.S. Pat. No. 6,806,296; 2004) uses lower hydrocarbon numbers and an external source of carbon dioxide mixed with steam. A special catalyst produces a syngas with a carbon conversion efficiency of at least 50%. If the syngas molar $H_2/CO$ ratio is 1.5 to 2.5, syngas is reacted in a FT catalyst process to generate liquid oil. If $0.5<H_2/CO<1.5$, react with catalyst to synthesize methanol or DME.

O'Rear (U.S. Pat. No. 6,774,148; 2004) blends final syngas from two syngas sources. First source is from a partial oxidation reaction of methane and oxygen to get H2/CO>2. Second source is from LPG and external carbon dioxide to synthesize a syngas of H2/CO>1.5.

Wolf (U.S. Pat. No. 7,960,441; 2011) combines carbon dioxide from combustion and hydrogen from electrolysis in a high temperature system to generate a syngas prior to conversion to hydrocarbon fuels.

Shulenberger et al. (U.S. Pat. No. 8,198,338 B2; 2012) discusses the production of high octane fuel from carbon dioxide and water. Feedstock consists of industrial carbon dioxide and water with the consumption of electricity to drive the process. End products include high octane gasoline, high cetane diesel, or other liquid hydrocarbon mixtures. The process primarily depends on the electrolysis of water into hydrogen and oxygen for initiation. Secondary processes include mixing of hydrogen with CO2 to optimize the conversion of CO2 to CO, mixing of hydrogen with CO to produce syngas for conversion to methanol or other hydrocarbons, synthesis of methanol, conversion of methanol to dimethyl ether (DME), conversion of DME to gasoline, conversion of DME to diesel, synthesis of gasoline directly from methanol, and synthesis of DME from syngas.

Surma et al. (U.S. Pat. No. 8,685,121 B2; 2014) discusses the processing of heterogeneous feedstocks including organic and inorganic material in a gasification/vitrification unit. The process includes a downdraft gasifier coupled to a vitrification unit which is then further coupled to a thermal residence chamber. Feedstocks are introduced into the gasifier and mechanically transferred downward with the volatile and non-volatile fractions exiting the gasifier vertically downward through a grated port into a high temperature joule heated vitrification unit. The vitrification unit is controlled at a higher temperature than the gasifier for further processing of the non-volatile fraction into a molten glass product, and the volatile fraction further processes in the vitrification headspace via exposure to plasma from torches or electrodes. The volatile fraction exiting the vitrification unit to a downstream thermal residence chamber operated a third temperature. The gasification process utilizes oxidants in the form of pure oxygen (90-99% pure), air, carbon dioxide, oxygen enriched air, steam or a combination thereof to maintain a reducing environment for the production of high quality syngas.

Other References

METSIM pyrometallurgical software. Proware, Tucson, Ariz.

Zennaro, et al., Syngas: The Basis of Fischer-Tropsch chapter, p. 38, Greener Fischer-Tropsch Processes, P. M, Maitliss & A. de Klerc, Eds., Wiley-VCH, Weinheim, Germany, 2013.

DOE 2000 report: Natural Gas to Liquids Conversion Project, Raytheon Engineers & Contractors, DOE Report 2000-1032585, 2000.

M. McKellar, et al., Aspen Process Model for the Misty Mountain Resource Recovery Plant, INL TAP Report INL/LTD-15-36850, October 2015.

Miglio, Zennaro and de Klerk, Environmental Sustainability chapter, p 329, Greener Fischer-Tropsch Processes, P. M, Maitliss & A. de Klerc, Eds., Wiley-VCH, Weinheim, Germany, 2013.

Discussion of Issues

The processing of heterogeneous waste materials, such as municipal solid waste (MSW) or construction and demolition waste (C&D), into a syngas of H2 and CO2 for conversion to liquid fuels is difficult by combustion methods. The variability in flammability and heats of combustion, as well as inorganic content and inertness makes these wastes difficult to burn, as well as trying to partially oxidize properly to a syngas, without sorting organic materials out from metals and inorganic (soil, glass, bricks, ash, etc.) materials.

The utilization of the Fischer-Tropsch catalytic synthesis (FTS) of hydrocarbon liquid fuels (HCLF) has focused on converting natural gas/methane or coal. Various forms of partial-oxidation are employed to obtain the energy for high temperatures required for gasification to a syngas of CO and H2 and to limit formation of CO2 and H2O. Pure oxygen and steam are usually added to make up defficiencies of oxygen and hydrogen in feedstock. Traditional preference is to obtain a molar H2/CO ratio of 2 or larger so that in the FTS, oxygen released from CO joins with excess H2 to make a waste effluent of water, rather than CO2. If insufficient H2 is introduced, CO2 is formed as a waste effluent, thus reducing the HCLF yield by reducing carbon conversion efficency.

A result is that focus of partial-oxidation generation of syngas has been on adding pure oxygen and/or steam to various feedstocks of CH4, coal, biomass or MSW. This is a major issue for heterogenious wastes because of the added amount of additives that must be added to obtain H2/CO>2, and the energy required to disassociate these additives toward gasification.

Another issue is that biomass (wood chips, etc.), MSW and C&D wastes have lower heats of combustion making it difficult to reach gasification temperatures with partial-oxidation requirements on CO and H2. Lower temperatures produce more complex hydrocarbon species that complicate the downstream cleanup process for the FTS.

A third issue is that biomass and MSW contain various amounts of moisture which lower the heat of combustion and temperatures even further, if not dried. Drying requires additional energy. If dried, steam needs to be added later to provide for the deficiency of hydrogen in waste requiring more energy input.

A fourth issue is that whereas biomass may be relatively homogenious, MSW and C&D wastes are not, containing organic material, inorganic material and metal. In a partial-oxidation process the organic materials need to be pre-sorted out to make the syngas.

Fifth, the heterogeneous nature of the MSW and C&D wastes makes it difficult to control the partial-oxidation process temperatures and reactions in the reaction chamber to obtain a consistant syngas composition with a minimum of undesireable hydrocarbon species.

A sixth issue is that there is always some ash generated. Temperatures from partial-oxidation methods are insufficient to obtain a molten, homogenious ash or slag that can be used to produce value-added construction products, rather than aggregate. The same temperature constraints can be said for any metal waste in the feedstock, reinforcing the need for sorting.

Syngas generation methods considered have usually been a form of partial-oxidation methods, the variations of which will be considered as one here. An alternative gasification method is by using electric furnace methods, using a variety of plasma torch melter (PTM) or graphite-electrode arc melter (GAM) furnaces. The focus of this work is on a form of the electric arc furnace (EAF) or GAM called a submerged arc furnace (SAF) with which the electrodes are immersed into the molten slag in the furnace for optimum performance.

An issue with the electric furnace process is cost of electricity compared to cost of partial combustion with pure oxygen. This would be a major factor if one follows the conventional practice of adding steam and other additives to raise the molar H2/CO>2 in the syngas for those wastes having H2/CO ratio near unity. Economic studies have shown that processing of MSW in a SAF compensates for the electricity costs by way of revenues from value-added products. The SAF processes are competitive if not more economic than other processes for waste-to-energy plant sizes larger than 500 tonnes/day.

Of the prior art U.S. patents, only the first section on recycling additives into a gasifier, reformer or similar unit prior to a synthesis conversion unit appears to be comparable to the embodiments proposed here. Most of those employ partial oxidation methods which are not used herein because of the heterogeneous nature of the feedstock. When CO2 is added to the process it is usually because the main feedstock is natural gas with an abundance of hydrogen so that the water gas shift can be used at lower temperatures to shift CO2+H2 to CO and H2O to give more carbon monoxide for conversion in the synthesis process. Many of the processes adding CO2 were generating alcohols that contain the OH radical and can utilize the additional oxygen from CO2.

The most similar patent to this is that of Gueh (U.S. Pat. No. 8,513,316; 2013) that mixes CO2 and tail gases from a FT synthesis with a carbaonceous feedstock and passes the mixture through a molten metal bath as a medium to obtain a syngas without any discussion of compositions or thermal conditions. The metal must have a relatively low melting temperature to be melted by an external source in the marine vehicle, too low a temperature to melt the ash contained with the carbonaceous feedstock, unless it is a gaseous feedstock. It appears impossible if not impractical to do what the author proposes from the patent description which is not documented by ant data. The present embodiment uses a molten slag/ash to assist in the gasification process and processes the additives within the system to get maximum benefit from their capabilities.

Advantages

A Prior work (U.S. Pat. No. 6,204,427, CA 2274540) discusses a process and apparatus (P&A) that can separate the metal and inorganic materials from the organic materials, and from organic materials produce a syngas to generate liquid fuels in a FTS process. This prior work is the basic P&A on which the proposed embodiment is an extension. The proposed embodiment couples prior P&A to a FTS process in such a way as to compliment each other. Compared to partial-oxidation methods for MSW, C&D and biomass wastes, advantages of the coupled SAF-FTS are:

To generate a cleaner syngas with less complex hydrocarbon species.
To reduce external input-energy requirements.
To increase energy efficiency of the coupled systems.
To increase the HCLF yield above that from the input feedstock alone.
To increase the internal recycling of process effluents.
To decrease the carbon footprint.
To resolve the presented issues of the partial-oxidation methods for heterogenious waste.

SUMMARY

Related Prior Patent Features

The present embodiment is built on and complementary to prior work by the inventors, including a unique SAF design process & apparatus configuration, to be referred to as "Process and Apparatus" (P&A), (U.S. Pat. No. 6,204,427, CA 2274540), a start-stop tapping device (U.S. Pat. No. 6,299,830) to tap high-temperature molten slag and metal into containers, and a rotating electrode drive mechanism (U.S. Pat. No. 5,914,979) to facilitate electrode operating gaps, tapping, and arc starting without a conducting medium.

The said P&A system previously patented, states the detailed design and operational methods that are available to be used here. In brief, The MSW or other waste material is shredded and fed into the submerged arc furnace. The SAF is divided into three (3) regions: the melt pot on the bottom, the psi region above the pot which has different refractory and a number of ports, and the reactor, gasifier or thermal oxidizer (in other applications) above the psi to provide residence time to complete gasification. Metal in the waste is melted at >1600 C and its phase sinks to the bottom of the pot, to be tapped into ingots when appropriate. Inorganics are melted at >1600 C, are immiscible with the metal, and rest above the metal in the pot.

The MSW and its organics are fed into the side of the pot/psi, creating a predominantly organic cold top at 1300 C or higher, sitting on top of the slag. The organics in the cold top are pyrolized and ultimately gasified. The power is input through two DC (or 3 AC) graphite electrodes sticking down through the cold top just into the molten slag, which is electrically conducting when heated to over 1400 C. The pot is highly insulated with high-temperature ruby refractory or equivalent next to the slag and a lighter, better insulator between the ruby and the steel shell. The thicknesses of the refractory layers are such as to cool the slag near the walls to develop a skull of slag to preclude wear of the refractory. There is no water cooling of the walls.

The purpose of the psi region is to continue the pyrolization of the organics and provide usually 8 ports (an octy-psi) for the electrode drives, pin-hole camera, an auto-darkening camera, other diagnostic instruments, and a manual access port. The psi region is insulated with two different layers of lighter insulation than the pot, to reduce heat losses and maintain gasification temperatures.

A narrower constrictor duct leaves the psi to the gasifier region to reduce carryover from the cold top. The gasifier is an extension to provide more residence time for the gasification reactions to be completed at high temperature. Neither the p or gasifier regions are water cooled in order to reduce heat transfer through their walls.

Following the SAF is one of several typical air pollution control type systems to clean up the offgas or syngas. It can be a water spray quench to rapidly cool the syngas to preclude reformation of hydrocarbons, followed by an acid gas scrubber and then a bag-house filter system.

The present embodiment opted for crossflow heat exchangers to cool the syngas to below 200 C so that a baghouse filter system can collect the particulate before the scrubber. A water-wall heat exchanger may replace the first crossflow heat exchanger.

After the cleanup system the syngas is cooled, compressed to the pressure to be used in the FT process and temporarily stored in tanks until used.

A commercial FT synthesis and refinery process (FTP) further cleans up the acid gases to the FT requirements and performs the various processes needed to produce the desired liquid fuel products and chemicals.

New Patent Features

The novelty of the embodiment is that the waste CO2, water and possibly the tail gas effluents from the selected FT system are recycled, first as coolants to the syngas, second to produce power from the energy so obtained (as also done by others), and then an appropriate amount of CO2 and steam therefrom are reheated and injected into the SAF to enhance the yield from the Feedstock, as well as to reduce the electrical energy required to the SAF. CO2 and H2O effluents from the FT system that are not used as additives to the SAF are also heated by the syngas and used in CO2-gas and steam turbines to cogenerate electricity to reduce the net required by the SAF.

The amount of recycled CO2 and steam from the FT system is critical to maximize the yield, minimize the cost, and provide the simplest and most robust compositions. This is called the optimum case. In the present embodiment, the optimum case is determined by running perturbations of different CO2, H2O, CH4 and O2 concentrations as additives through a pyrochemical software model (METSIM by Proware). The resulting equilibrium syngas concentrations were input to a FT Products model developed for the purpose and based on test results. The perturbations with the highest yield, lowest cost and most recycling of additives were selected for the optimum case. Perturbations of approximately 20% of the optimum values give similar results showing the robustness of the embodiment. The result without additives gives a much inferior result. The optimum result may vary depending upon the FT system effluent concentrations.

In the present embodiment, approximately ⅓ of the CO2 and ⅕ of the H2O generated by the FT system are recycled to the SAF, thus reducing the carbon (and water) footprint. With the additives as determined, the yield from the MSW is increased considerably over what it would be without the additives or what would result from a partially oxidized method. The net electricity required for the SAF is reduced by more than 10%.

The novelty of the energy recovery over traditional methods is 1) heating of waste products from the FTP by the syngas to be injected into the SAF as additives to improve conversion efficiency to liquid fuels and 2) heating of waste products from the FTP by the syngas to higher temperatures to produce electric power via gas and steam turbines. A corollary of the above is using the waste products from the FTP products to rapidly cool (quench) the syngas to inhibit reformation of hydrocarbons prior to preparation for the FT synthesis. The use of a SAF gasifier enables the recycling of FT synthesis energy and mass flows in a novel, advantageous manner, not just utilizing waste energy to heat water to steam for power.

BRIEF DESCRIPTION OF THE DRAWINGS

Figures depicting the details of the embodiment and to the structures to which is attached are on the accompanying diagrams, as well as photos of the associated test facility. Reference numerals throughout the various FIGURES denote like elements.

DRAWINGS—REFERENCE NUMERALS

1 Waste feedstock into submerged arc furnace (SAF)
2 Hopper
3 Molten metal
4 Molten slag
5 Recycled steam from FT process
6 Recycled CO2 from FT Process
7 Shredder, compactor, feeder components
8 Electric furnace in SAF configuration
9 Molten or temporarily partially-solidified metal
10 Molten slag
11 Cold top of feedstock, partially processed
12 Graphite electrodes (2).
13 Offgas to gasifier
14 Constrictor
15 Reactor to complete gasification
16 Syngas
17 Heat exchanger HX1—syngas to low pressure CO2 for SAF
18 CO2 gas turbine—after reheat process
19 Heat exchanger HX2—syngas to medium pressure CO2
20 CO2 gas turbine—CO2 before reheat process
21 Heat exchanger HX3—syngas to high pressure CO2
22 Heat exchanger HX8—syngas to medium pressure for SAF
23 H2O Steam turbine—with takeoff for reheating SAF steam
24 Steam condenser
25 Condensate water pump
26 Heat exchanger HX9—syngas to FTP waste water recycle
27 Heat exchanger—syngas to separate Rankine cycle steam
28 Steam turbine for separate Rankine cycle
29 Steam condenser
30 Water pump to raise condensate to high pressure for separate Rankine cycle
31 Boiler to boil water from scrub water waste heat
32 Filter baghouse to collect particulate to recycle to SAF
33 Acid-gas scrubber
34 Rectisol or equivalent S-cleanup system
35 Sulfolin or equivalent S-recovery process
36 CO2 for blanket gas in input materials handling
37 Sulfur for recycling
38 A naphtha liquid refinery
39 Chemical products
40 Fuel products
41 Fe-LTFT (low temperature, Fischer-Tropsch) catalytic process
42 Gases
43 Benfield or equivalent process
44 Tail gas
45 CO2 to be recycled
46 Oil product & waxes
47 Aqueous product including alcohols
48 Fischer-Tropsch refinery
49 Chemical products
50 Fuel products
51 FTP waste water for recycling
52 Outline of a simplified commercial Fischer-Tropsch synthesis & refinery system
53 Particulate collected
54 Scrub water cooler
55 Scrub water blowdown to recover salts
56 Compressor
57 Storage tank

DETAILED DESCRIPTION

Description

The Prior work (U.S. Pat. No. 6,204,427, CA 2274540), on which this work is an extension, utilizes an electric furnace, in the form of a submerged arc furnace (SAF) configuration to simplify the operation because the SAF separates the metal and inorganics from the organics by melting the former into the bottom of the melt pot and pyrolizing and gasifying the organic materials. The concentrated energy density of the SAF heats the materials to sufficiently high temperatures to tap out the metal into ingots for recycling, tap and cast the inorganics into construction products, and pyrolizing and gasifying the organics into a syngas (without oxidation) for use in a Fischer-Tropsch synthesis and refining process (FTP) to generate liquid fuels and chemicals.

The FT process is very exothermic and operates at high pressure many times atmospheric pressure. A low temperature FTP with iron-based catalyst (Fe-LTFT) operates approximately between 230-240 C and a high-temperature process (Fe-HTFT) at 320-330 C and pressures usually of 15 to 25 atmospheres. The FTP waste water and CO2, as well as some other tail gases are output under these temperature and pressure conditions. Some commercial systems utilize this waste heat in various ways, such as for driving low temperature turbines, for drying, or for other lower temperature heating applications. In the present patent, these FTP H2O and CO2 wastes are heated to much higher temperatures and recycled to the gasification process. The excess CO2 and H2O beyond recycling needs are also heated to higher temperatures and used in gas and steam turbines to generate system power. The source of the energy recycled comes from both the FT synthesis process and from the syngas cooling required prior to the clean-up and feeding to the FTP.

The four main thrusts for Fischer-Tropsch synthesis to liquid fuel generation can be expressed as XTL where X is the feedstock. GTL is (natural) gas to liquid, CTL is for coal, BTL is for biomass and WTL for waste such as Municipal solid (MSW) waste. XTL systems can be separated into subsystems such as 1) syngas generation, 2) syngas cooling and heat recovery, 3) syngas clean-up, and 4) the Fischer-Tropsch conversion and refining systems.

The molar ratio of H2/C in most hydrocarbon liquids (diesel, gasoline, not alcohols) is approximately 1.1. For methane/natural gas, molar H2/C=H2/CO=2; therefore, an excess of H2, which is used to remove the excess oxygen in the FT synthesis as water. For bituminous coal, H2/C is about 0.8; therefore, one would have to add a considerable amount of steam to convert all the excess oxygen back into water after FTS. An alternative, is to add only enough hydrogen to get the H2/CO ratio to 1.1 so that all the C in the syngas CO has the potential to be converted to hydrocarbon compounds. The excess oxygen from the FT synthesis is then removed by CO into CO2. This reduces the yield of liquid fuels because there is less CO to react in the FT process. Traditional methods with coal, biomass or MSW that require H2/CO<2.0 add oxygen and steam to get the syngas H2/CO up to or over 2 in order to get the oxygen removed from CO to predominantly H2O. The energy comes from the partial combustion that also produces some CO2 and H2O and reduces the yield somewhat. If electric gasification is used with traditional reaction compositions, the pyrolysis and gasification can require more energy than necessary when a different philosophy (electrical heating) is employed.

The two most common FTS processes are with iron (Fe) or cobalt (Co) catalysts. Iron catalysts can activate the water gas shift (WGS), CO+H2O→H2+CO2, at the FTS temperatures used to increase H2 and the H2/CO ratio, but at a cost of converting CO to CO2. Cobalt catalysts do not activate that WGS reaction. Whether CO is reduced by the WGS or by a direct conversion of CO to CO2 in the FT reactor appears to be a moot point, because the carbon conversion efficiency is reduced a similar amount with either method. The direct method is preferred here because the SAF syngas temperatures result in very small concentrations of H2O and CO2, and the process is not dependent on the WGS so either Fe- or Co-FTS can be used.

Performance Parameters

A parameter significant to the gasification process is the molar C/O ratio of the input feed and any additives. The C/O ratio needs to be very close to unity in order to maximize the CO from the carbon in the feedstock. Otherwise the process would form either CO2 if excess O2 is available or free carbon if the O2 is deficient.

Another parameter used to indicate performance of XTL processes is the carbon or conversion Efficiency. The C-efficiency can be applied to the syngas generation, the FTS conversion, or the overall system. For the syngas generation, it is the molar ratio of CO generated to the carbon in the feedstock. For the FT conversion, a practical C-efficiency would be the ratio of C in the liquid fuels compared to the CO in the syngas. An overall C-efficiency would then be the molar ratio of the carbon in the liquid fuel generated divided by the carbon in the feedstock.

A third parameter used is the molar ratio of H2/CO (which also equals the molar H2/C). There are several different processes from feedstock to FT syncrude for which the H2/CO ratio can be specified:

The feedstock input H2/CO ratio (with or without moisture).

The "fresh" syngas H2/CO ratio generated from the gasification system.

The inlet syngas to the FT system which may be a mixture of fresh and recycled syngas.

The exit or recycled syngas H2/CO ratio usually from the tail gases separated from the liquid fuels, waxes, CO2 and water exiting the FT system.

The carbon conversion efficiency discussed above will also affect the H2/CO ratios along the flow streams.

Consider the input H2/CO ratios for the different XTL. For GTL with G=CH4, the feedstock H2/CO ratio is 2, but partial oxidation methods usually generate CO2 and H2O in the syngas; hence, the GTL syngas H2/CO is usually less than 2 and the carbon efficiency is less than 100%; therefore, GTL systems try for H2/CO~2.15.

For CTL with coal assumed to be fixed carbon (char), H2/C is about 0.7; but for an Eastern bituminous coal, H2/C may be 0.8 or higher. A BTL biomass of approximate chemical composition of C6H9O4.2 (excluding moisture), H2/C would be 0.75, but with moisture could be 1.5 or higher. A typical WTL MSW with an average composition of C6H10O3 would be 0.83 but as high as 1.5 including associated moisture. The organic formulas have been expressed in the form of cellulose, C6H10O5, for consistency.

With CH4, there is a "natural" excess of H2, so it is convenient to carry away the oxygen freed from the CO in the FTP as H2O. The electrical pyrolysis/gasification methods do not use oxidation methods and create sufficiently high temperatures to minimize the CO2 and H2O in the syngas, which can then have the same H2/CO ratios as in the feedstock. The oxygen freed from the CO can then be carried away by CO as CO2 instead of the deficient H2. This would reduce yield, unless one adds CO2 to generate more CO. The H2/CO variations will be discussed in more detail below.

Most of the XTL Research and Development has been with GTL, followed by CTL, with some for BTL, and very little with WTL. The last is probably because the WTL waste is more heterogeneous. Compositions vary widely and are not amenable to partial oxidation for gasification without sorting and sizing. In the following, simple examples of the gasification and FT processes are discussed to show the novel differences between the partial oxidation and electric gasification processes.

GTL Example with Partial Oxidation for Gasification

Zennaro, et al. (Syngas: The Basis of Fischer-Tropsch chapter, p. 38, Greener Fischer-Tropsch Processes, P. M, Maitliss & A. de Klerc, Eds., Wiley-VCH, Weinheim, Germany, 2013) provides the GTL reactions using partial oxidation for syngas generation. The overall reaction can be written as:

| | |
|---|---|
| 8CH4+5O2→ | input composition |
| →7CO+15H2+CO2+H2O→ | syngas composition |
| →(—CH2-)+7H2O+H2+CO2+H2O→ | FT conversion |
| →(C7H14+C7H14+2)+CO2+8H2O, | after refining | where the single H2 has been combined with an alkene (CnH2n) to make an alkane (CnH2n+2) and the C7 formulas represent the several alkenes and alkanes (of higher and lower C-numbers) formed from FTP before the refining to a particular fuel or chemical distribution.

Note that CO2 and H2O are waste effluents from the process, of which 1-mole each of CO2 and H2O are formed in the gasification process. Also, pure oxygen must be added. The carbon efficiency of gasification is about 7 moles/8 moles=87.5% which is also the result for the overall process if all the CO is converted to liquid fuel. Actual conversion rates are about 50-90% depending on the process.

The energy for conversion is provided by the partial oxidation of the CH4 and the fact that the FTP is exothermic. The energy efficiency of CH4 is reduced from its maximum by the generation of half of the H4 converted to H2O in the gasification process. There is an added decrease due to the CO2 formed. Methane not reacted is separated and returned to the partial oxidation process, or along with methane effluent from the FTP is routed to power generation equipment.

The GTL tradition has dictated that in the other XTL applications, enough hydrogen is provided to generate most of the waste effluent as water, as in the GTL. Hydrocarbon fuels have a molar ratio of H2/C~1.1, whereas CH4 is 2.0 and tradition tries for H2/CO=2.15 in the syngas as above in order to yield the extra H2 needed for the 7 additional moles of water effluent.

WTL Example with Electric Heating for Gasification

The GTL tradition of H2/CO~2 is impractical and unnecessary when using electrical gasification methods. Application of electrical pyrolysis to CH4 is inappropriate, but can easily be applied to MSW and biomass waste streams. A typical formula for MSW based on the EPA fact sheet of discards (non-recyclables) of 2012 and modified to the proposed project is C6H10O3. This has been written in a form comparable to cellulose (C6H10O5). Biomass is given as CH1.5O0.7, or C6H9O4.2 as with cellulose (Ibid., p. 39).

Considering the organics of MSW, its C/O molar ratio is 6/3=2 needing more O2; its H2/CO ratio is 5/6=0.83 needing more H2. Gasification to a viable syngas of CO & H2 then needs additional moisture (most of which is within the MSW if not dried) and oxygen. The SAF gasifier can then recycle FTP effluents H2O and CO2 (to provide not only oxygen but additional CO to increase yield). Pure oxygen could be added, but is not needed with the electrically generated pyrolysis and gasification and with the H2O and CO2 available from the FT process, thus saving the cost of pure oxygen.

A selected reaction might be:

| | |
|---|---|
| C6H10O3+2H2O+1CO2→ | input composition |
| →CO+7H2→ | syngas composition |
| →4.67(—CH2-)+2.3CO2+2.3H2O. | FT conversion |

The syngas is essentially all CO and H2 because the process is at sufficient temperatures to give negligible CO2 and H2O (as well as any other hydrocarbons) per equilibrium reaction calculations The theoretical performance parameters indicate a C-efficiency of 7/7=100% for gasification (including the added CO2 as input) and 4.67/7=66% for the FT conversion or 66% overall. Since the internally recycled CO2 is not an external feedstock, the carbon efficiency of gasifying the feedstock is 7/6=117%, and for the liquid fuel production is 4.67/6=78%.

If H2/CO=7/7=1 for gasification, then it is much below the traditional value of ~2.15. This is possible because of the electrical heating instead of partial combustion. Actual overall conversion rates are about 50-90% depending on the FT process.

The other difference from traditional processes is that the "excess" oxygen from CO in FT synthesis must also be carried away by the CO2 as well as the H2O. This decreases the yield of liquid fuels per mass of MSW, but is more than made up for with the additive CO2. The SAF processing does not result in as much waste water effluent, and part of this is needed for recycling through the SAF. The result is a reduction in the carbon footprint and the amount of final waste water from the FT process. In this ideal case, 1 mole per 2.3 of CO2 generated (43.5%) is recycled.

Operation

Prior Patent of which this is an Extension

Figure 1:
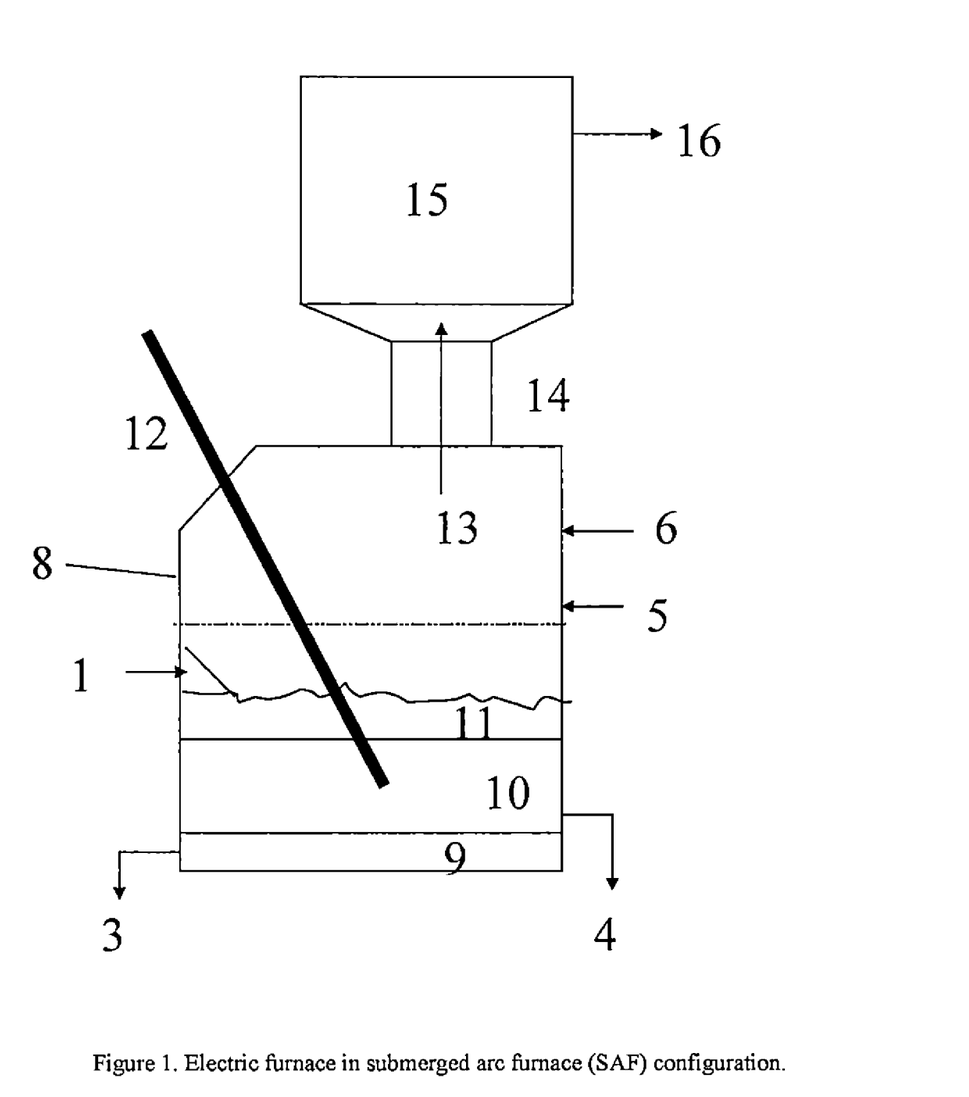
FIG. 1 a representation of an electric furnace in the SAF form.
Figure 2:
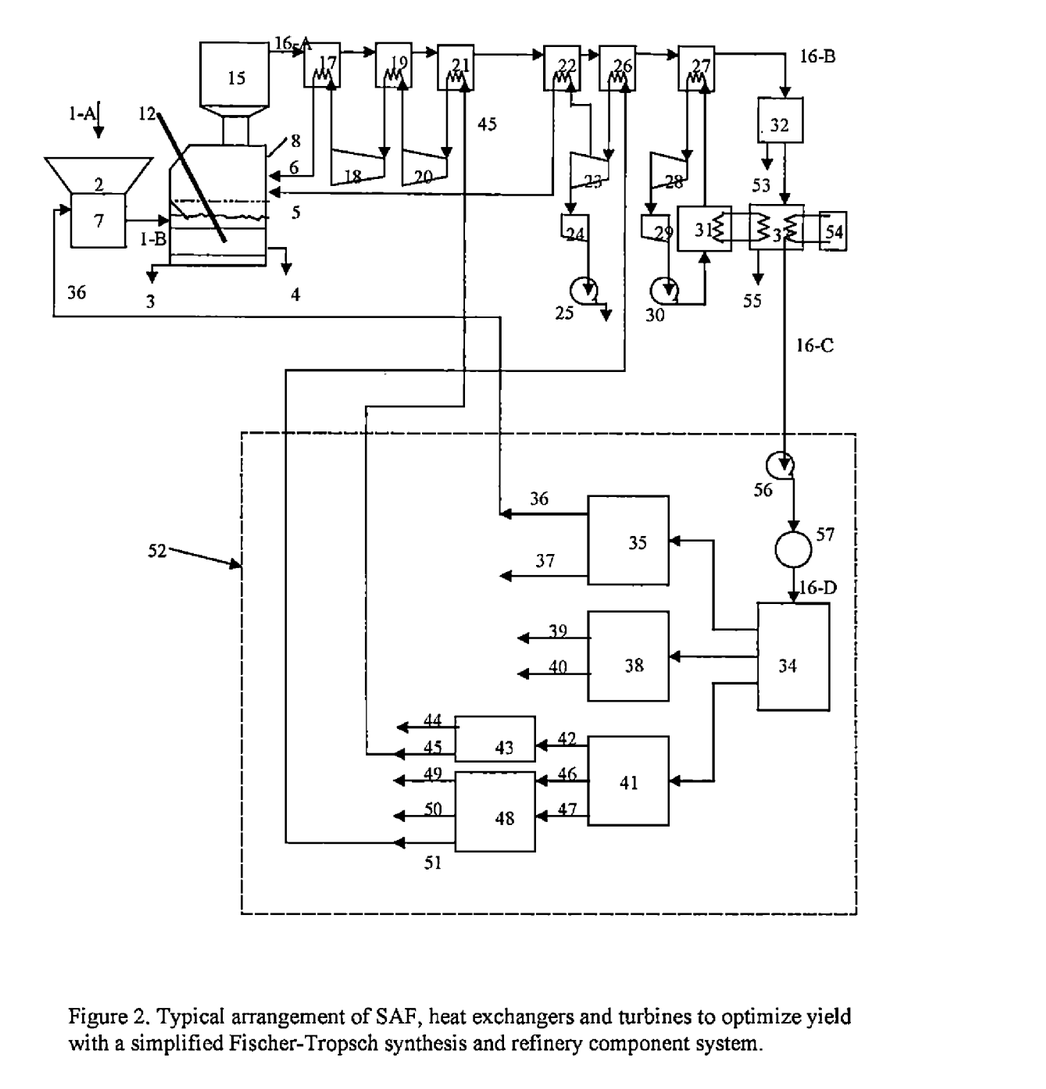
FIG. 2 flow diagram of the basic elements.
Figure 4:
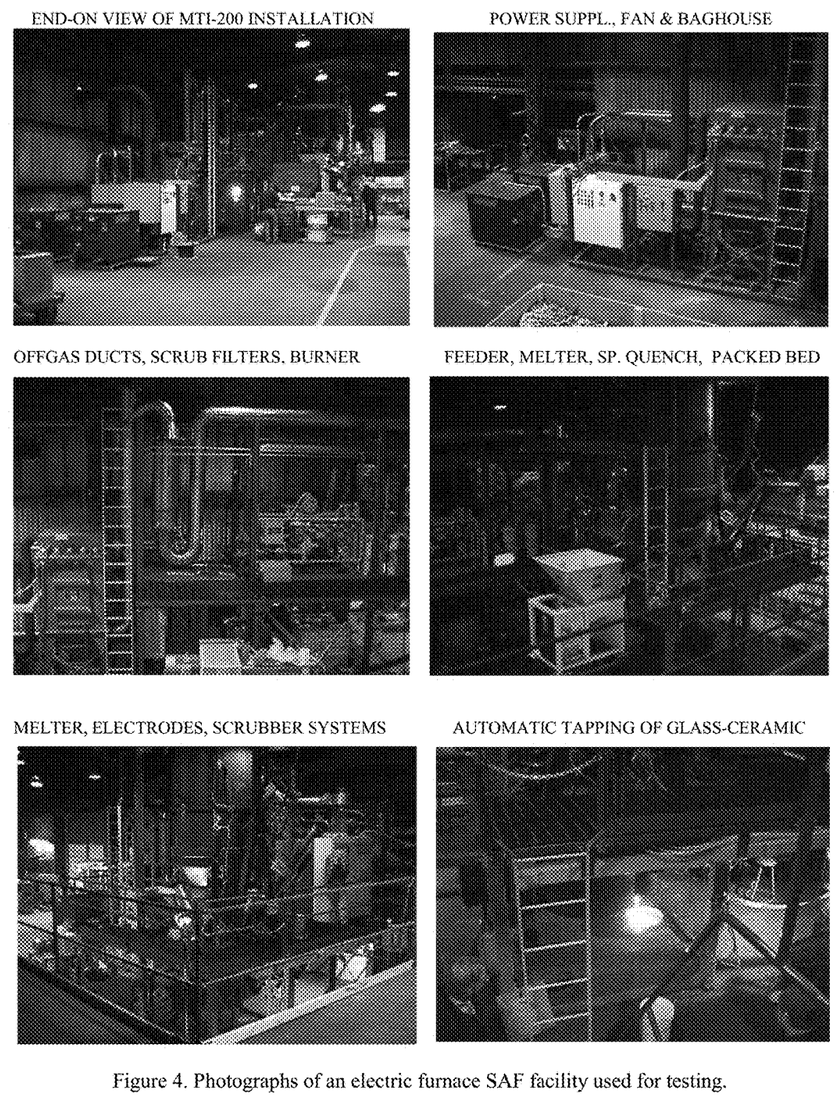
FIG. 4 photographs of a related electric furnace test facility.

As shown in FIGS. 1 & 2, unsorted MSW 1-A (with the exception of extremely bulky items that are manually sized) is dumped into a pit, loaded into a hopper 2, and routed to a crusher-compactor-feeder system 7 to be fed into the middle of the electric furnace, shown as a SAF 8. The thus-sized MSW 1-B forms a cold top 11 above a previously formed molten slag 10. The power supplied through the electrodes 12 passing through the SAF 8 roof generates a concentrated electromagnetic field in the molten slag. The magnetic field rotates the ~1700 C electrically-conducting, molten slag 10 so as to distribute the MSW into the cold top 11 covering the slag. The surface of the cold top has been measured at a temperature of ~1300 C. The test facility with which experimental evidence has been determined is shown in FIG. 4.

Metal in the MSW 1 is melted into a 1650 C molten metal layer 9 at the bottom of the SAF 8 until it builds up sufficiently to be tapped 3 into metal ingots. Inorganic materials such as ash, dirt, bricks, and glass in the MSW 1 are melted to sustain the slag layer 10, which is tapped 4 at 1650-1700 C to be cast into construction products. FIG. 4 shows the patented (U.S. Pat. No. 6,299,830) remote-controlled tapping device in operation.

The organic material in the cold top 11 settles in to over 1300 C to become pyrolized and mostly gasified prior to leaving the SAF 8. The steam additive 5 and the CO2 additive 6 are injected into the SAF 8 to react chemically with the cold top 11 and its offgas. The injection is also used to create turbulence in the top of the SAF 8 to enhance reduction reactions. The offgas 13 leaves the SAF 8 through a constrictor 14 to the gasifier 15 at approximately 1100 C as controlled by the power to the electrodes 12.

The constrictor 14 serves to decrease particulate carryover to the gasifier 15. The gasifier 15 provides additional residence time for the gasification to take place. It is well insulated and a temperature drop of only 50-100 C has been calculated. Additional heaters can be placed in the gasifier 15 to increase temperatures if needed.

Figure 3:
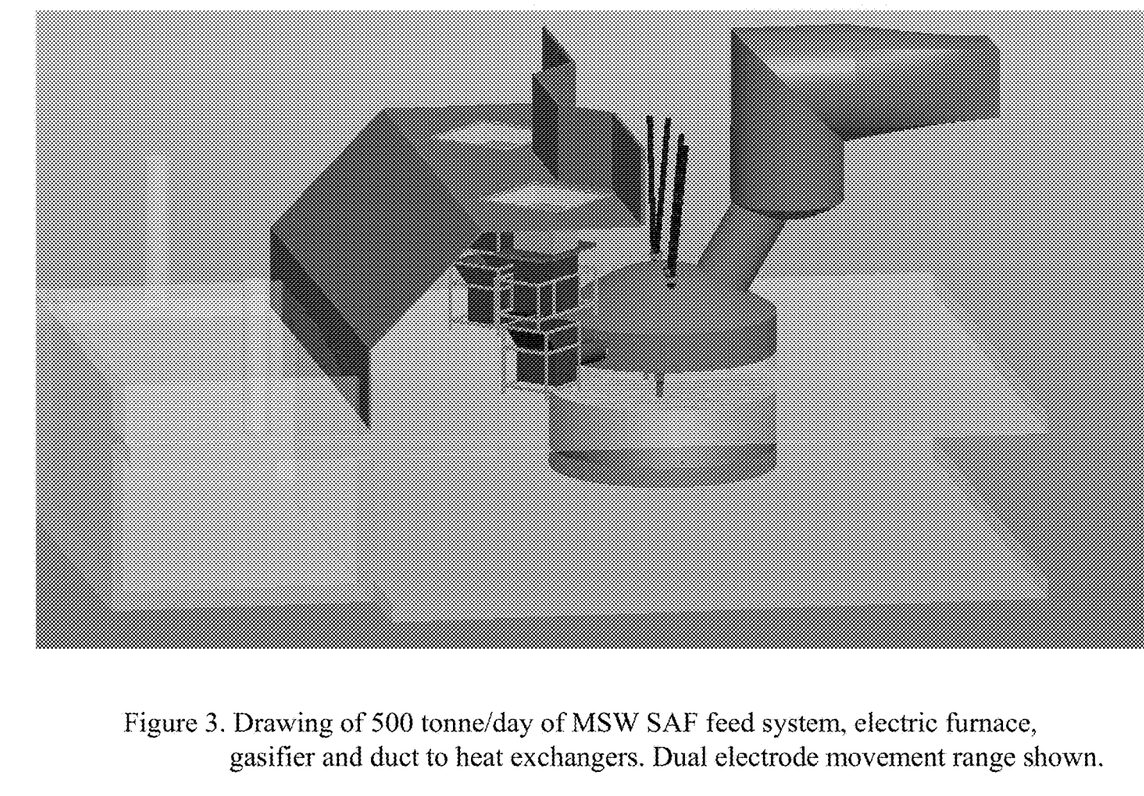
FIG. 3 SAF drawing with gasifier to heat exchangers for 500 tonne/day of MSW.

FIG. 3 shows an isometric drawing of a proposed 500 tonne/day MSW electric furnace plant in the SAF configuration. The range of the two electrodes is shown as rotated via electrode drive U.S. Pat. No. 5,914,979.

Equilibrium-based WTL Example

The reactions discussed in the Description are "ideal" in that they assume completion to the desired components. The following is the adjustment based on pyrochemical calculations assuming sufficient time to obtain equilibrium compositions at pressure and temperatures involved. Design calculations have shown this to be highly probable. Also included in the analysis are the FT Products calculations to be discussed later.

For the MSW product considered here as an example, test data from a FTP process is used to demonstrate the energy recovery methods. The example is for 500 tpd of MSW as prescribed above (66.5% organics, 15% moisture, 18.5% other) with additives of 5% moisture and 19% CO2 (where the last additives are a percent of and added to the 500 tpd of MSW giving 620 tpd total) and are in the range of an optimum case. The input organic mass flow rate is then 332.5 tpd MSW-organics, 75 tpd MSW-moisture, 25 tpd added moisture, and 95 tpd added CO2. The FTP effluent output is predicted at approximately 125 tpd water and 284 tpd CO2, of which 25 tpd water and 95 tpd are additives and the remainder excess waste effluents.

The additive amounts were obtained after many perturbations utilizing pyrochemical equilibrium calculations, potential additives CO2, CH4, H2O and O2, prorating liquid fuel generation with test values, and integrating the FTP effluents as additives to the SAF.

The following optimum reaction relations were developed. On a mass basis the input to the syngas generator for the particular site considered above is:

66.5% MSW-Organics+15% MSW-Moisture+5% Added H2O+19% Added CO2

On a molar basis:

C6H10O3+1.629H2O_msw+0.543H2O_add+
0.844CO2→  input composition

→5.95CO+5.83H2+0.034CH4+0.015CO2+
0.003H2O→  syngas composition

→(—CH2-)+2.015CO2+2.003H2O+0.034CH4,  FT conversion where the syngas composition is based on the 1 mole of C6H10O3 put in.

Note that the carbon conversion efficiency for this electrical gasification is 5.95/6=99.2% if the recycled CO2 is excluded. In the FTP relation, the reason 6 (—CH2-) are not obtained is that free oxygen would be formed which then oxidizes the (—CH2-) or equivalent to CO2 (and/or CO) and H2O. The FTP carbon efficiency is now 4/6=67% if all CH2 radicals are converted to liquid fuel, compared to 78% for the ideal WTL or 83% for the ideal GTL process.

One can add more hydrogen, but with H2O it would be a breakeven proposition since the end product would be H2O and the added input H2O needs to be dissociated or the equivalent. If add CH4, the process is closer to the GTL, but results in just turning the CH4 added into liquid fuel as in a GTL or end up with more CH4 in the Syngas, so why bother in a SAF for solid wastes. If add more CO2, obtain more O2 than can use and then get more CO2, thus self-defeating. CO2 only helps when the feedstock is oxygen limited.

The conclusion is that when processing MSW and the similar biomass or even coal, the waste effluents will be both H2O and CO2. The present embodiment shows how to do this most effectively.

The estimated equilibrium syngas compositions are calculated with pyro-metallurgical software, METSIM by Proware at the temperatures estimated in the SAF 8 above the melt at 1300 C and the gasifier 15 at a conservative 1000 C. The syngas 16-A is assumed to leave the gasifier 15 and enter a heat exchanger 17 at a minimum of 900 C. Heat transfer losses calculated for the well-insulated gasifier 15 indicate the temperature should be at least 50 C higher. The significant compositions found using METSIM under Gibbs equilibrium conditions are given in Table 1. Limiting conditions for some of the perturbations calculated are also shown in Table 1.

The FTP system for this 500 tpd SAF plant example is a Fe-LTFT (iron catalyst, low-temperature, 230-240 C, FT synthesis system). The FTP effluents, H2O (as saturated liquid) and gaseous CO2 are assumed to be available at ~200 C and 15 atm pressure. For other FTP systems, design adjustments can be made. In application, the FTP will be dependent on the commercial provider.

Extensions of Rentech data from DOE 2000 report (Natural Gas to Liquids Conversion Project, Raytheon Engineers & Contractors, DOE Report 2000-1032585, 2000) from GTL/CH4 processing to that of the MSW provided a basis for determining the difference in the syngas composition. Estimates of the conversion of the HCLF generated are based on carbon content and then prorated based on the amount of hydrogen available. The oxygen from CO unable to be combined with hydrogen would be combined with CO to make CO2. If no additives are input with the feedstock, the yield of HCLF is greatly reduced. Adding CO2 and H2O to make up for hydrogen and oxygen deficiencies in the feedstock, and iterating over perturbations of the additives to eliminate free oxygen and H2 results in an optimum amount of additives, as well as an estimate of the CO2 and H2O waste from the FTP.

A FT Products spreadsheet calculation is used to optimize the additive wt % as well as what additives to use. CO2, H2O, CH4, and pure O2 were examined as potential additives. The optimum is found, based mainly on the yield of liquid fuel products, the availability of the additives, and the relative costs per gallon of that fuel for different additive combinations (see Tables 2A & 2B). The optimum result was found to be 5 wt % H2O and 19 wt % CO2 additives.

TABLE 1

Selected syngas equilibrium compositions for syngas leaving Gasifier via METSIM.

T_equilibrium is taken at 1000 C in Gasifier.
Units are in wt % of MSW input unless designated. MSW organics incl. 0.8% sulfur totals 82.3 wt % of MSW.
Small concentrations are given more significant digits.

| Run Label | A | B | C | G4 | G1 = G3 | G6 | Q | D | F2 |
|---|---|---|---|---|---|---|---|---|---|
| Run ID | As Is No Add | Min H2O | Add CO2 | 5/18/0/0 | 5/19/0/0 Optimum | 7/18/0/0 | 8/15/5/0 | Pure O2 | 4/12/0/3 |
| Description | No Additives | Add 8% H2O | Add 20% CO2 | Add 5 wt % H2O; 18 wt % CO2 | Add 5 wt % H2O; 19 wt % CO2 | Add 7 wt % H2O; 18 WT % CO2 | Add 8 wt % H2O; 15 wt % CO2, 5 wt % CH4 | Add 7 wt % O2 | Add 4 wt % H2O; 12 wt % CO2; 3 wt % O2 |
| CH4 | 11.467 | 4.398 | 4.220 | 0.531 | 0.324 | 0.083 | 3.945 | 4.493 | 0.574 |
| CO | 66.231 | 78.620 | 91.640 | 96.474 | 97.370 | 96.390 | 97.680 | 78.450 | 92.600 |
| CO2 | 0.000 | 0.021 | 0.022 | 0.250 | 0.416 | 1.619 | 0.036 | 0.017 | 0.218 |
| H2 | 3.908 | 6.568 | 5.720 | 7.204 | 7.244 | 7.435 | 7.938 | 5.652 | 7.083 |
| H2O | 0.000 | 0.152 | 0.012 | 0.164 | 0.273 | 1.100 | 0.025 | 0.011 | 0.147 |
| O2 | 0 | 0 | 0 | 0 | 0 | 0 | 0 | 0 | 0 |
| C1 | 0 | 0 | 0 | 0 | 0 | 0 | 0 | 0 | 0 |
| CS | 0.000821 | 0 | 0.000182 | 0.0000147 | 0.00000893 | 0.000002 | 0 | 0.000173 | 0.0000158 |
| CS2 | 0.164 | 0 | 0.0294 | 0.00194 | 0.00118 | 0.00028 | 0 | 0.02836 | 0.00212 |
| COS | 0.0618 | 0.0536 | 0.0687 | 0.0596 | 0.0599 | 0.0579 | 0.05507 | 0.05997 | 0.0582 |
| SO2 | 0 | 0 | 0 | 0 | 0 | 0 | 0 | 0 | 0 |
| S2 | 0.000198 | 0 | 0 | 0.000123 | 0.000122 | 0.000118 | 0.000117 | 0 | 0 |
| H2S |  | 0.8199 | 0.7848 | 0.8146 | 0.8151 | 0.817 | 0.8189 | 0.791 |  |
| wt % Sum | 81.8 | 90.6 | 102.5 | 105.5 | 106.5 | 107.5 | 110.5 | 89.5 | 100.7 |
| COS (vol %) |  | 1.0804446 | 0.0135 | 0.014 | 0.0134 | 0.01191 |  |  | 0.0141 |
| H2S (vol %) |  |  | 0.33 | 0.336 | 0.333 | 0.3122 |  |  | 0.347 |
| H2/CO molar | 0.826 | 1.169 | 0.874 | 1.045 | 1.042 | 1.08 | 1.138 | 1.019 | 1.071 |
| C/O molar | 1.303779 | 1.0945572 |  | 1.006957 | 1.0014604 | 0.98421484 | 1.07020874 | 1.100071786 | 1.001 |

TABLE 2A

Liquid fuel product results for different Additives for 500 tpd MSW plant: Input and fuels produced.

| Run Label | A | B | C | G4 | G1 = G3 | G6 | Q | D | F2 |
|---|---|---|---|---|---|---|---|---|---|
| Run ID | As Is No Add | Min H2O | Add CO2 | 5/18/0/0 | 5/19/0/0 Design Case | 7/18/0/0 | 8/15/5/0 | Pure O2 | 4/12/0/3 |
| Description | No Add | Add 8% H2O | Add 20% CO2 | Add 5 wt % H2O; 18 wt % CO2 | Add 5 wt % H2O; 19 wt % CO2 | Add 7 wt % H2O; 18 WT % CO2 | Add 8 wt % H2O; 15 wt % CO2, 5 wt % CH4 | Add 7 wt % O2 | Add 4 wt % H2O; 12 wt % CO2; 3 wt % O2 |
| Input |  |  |  |  |  |  |  |  |  |
| 500 tpd MSW-avg_2012 | 501 | 501 | 501.0 | 501 | 501 | 501 | 501 | 501 | 501 |
| Moisture in IWS | 75 | 75 | 75.0 | 75 | 75 | 75 | 75 | 75 | 75 |
| Added(+), dried (−) or excess water | 0 | 40 | 0.0 | 25 | 25 | 35 | 40 | 0 | 20 |
| CO2 Recycled from FTP | 0 | 0 | 100.0 | 90 | 95 | 90 | 75 | 0 | 60 |
| Added CH4 to get more H2 | 0 | 0 | 0.0 | 0 | 0 | 0 | 25 | 0 | 0 |
| Added O2 for excess C and to provide energy | 0 | 0 | 0.0 | 0 | 0 | 0 | 0 | 35 | 15 |
| Non organics (ash, metal, Cl/S, N2) | 92.5 | 92.5 | 92.5 | 92.5 | 92.5 | 92.5 | 92.5 | 92.5 | 92.5 |
| Organics in IWS | 333.5 | 333.5 | 333.5 | 333.5 | 333.5 | 333.5 | 333.5 | 333.5 | 333.5 |
| Net organics to Syngas (excl. N2) | 333.5 | 333.5 | 433.5 | 423.5 | 428.5 | 423.5 | 433.5 | 333.5 | 393.5 |
| Net Water to syngas | 75 | 115 | 75.0 | 100 | 100 | 110 | 115 | 75 | 95 |
| Syngas H2 & CO | 408.5 | 448.5 | 508.5 | 523.5 | 528.5 | 533.5 | 548.5 | 408.5 | 488.5 |
| H2/CO molar syngas to FTP | 0.83 | 1.17 | 0.87 | 1.05 | 1.04 | 1.08 | 1.14 | 1.01 | 1.07 |
| C/O molar Syngas to FTP | 1.0000 | 0.9993 | 0.9996 | 0.9957 | 0.9930 | 0.9726 | 0.9994 | 0.9996 | 0.9961 |
| Liquid Fuels Produced |  |  |  |  |  |  |  |  |  |
| Naphtha Produced (BPD) | 17.1 | 20.4 | 23.8 | 25.0 | 25.2 | 25.0 | 25.3 | 18.7 | 23.3 |
| Linear Alpha Olefins (BPD) | 18.5 | 22.0 | 25.6 | 26.9 | 27.2 | 26.9 | 27.3 | 20.2 | 25.1 |
| Linear Paraffins (BPD) | 13.4 | 15.9 | 18.5 | 19.5 | 19.7 | 19.5 | 19.7 | 14.6 | 18.2 |

TABLE 2A-continued

Liquid fuel product results for different Additives for 500 tpd MSW plant: Input and fuels produced.

| Run Label | A | B | C | G4 | G1 = G3 | G6 | Q | D | F2 |
|---|---|---|---|---|---|---|---|---|---|
| Diesel Product (BPD) | 20.8 | 24.8 | 28.9 | 30.4 | 30.7 | 30.4 | 30.8 | 22.8 | 28.3 |
| Kerosene Product (BPD) | 0.0 | 0.0 | 0.0 | 0.0 | 0.0 | 0.0 | 0.0 | 0.0 | 0.0 |
| Wax (C20-C50) (BPD) | 52.7 | 62.6 | 73.0 | 76.8 | 77.5 | 76.8 | 77.8 | 57.5 | 71.5 |
| Total Liq. Diesel Product excl Alcohols: TLDF | 122.4 | 145.6 | 169.7 | 178.7 | 180.3 | 178.5 | 180.9 | 133.8 | 166.4 |
| Net TLDF accounting for excess O2 | 92.9 | 135.5 | 132.9 | 155.2 | 156.3 | 158.1 | 165.5 | 113.8 | 146.7 |
| Mixed Alcohol Product (BPD) | 6.6 | 7.9 | 9.2 | 9.6 | 9.7 | 9.6 | 9.8 | 7.2 | 9.0 |
| Sum of Products | 129.1 | 153.5 | 178.9 | 188.3 | 190.0 | 188.1 | 190.7 | 141.1 | 175.4 |

TABLE 2B

Liquid fuel product results for different Additives for 500 tpd MSW Plant: Summaries

| Run Label | A | B | C | G4 | G1 = G3 |
|---|---|---|---|---|---|
| Run ID |  |  |  | 5/18/0/0 | Optimum |
| Additives in wt % of MSW (H2O, CO2, CH4, O2) | As Is No Add 0, 0, 0, 0 | Min H2O 8, 0, 0, 0 | Add CO2 0, 20, 0, 0 | 5, 18, 0, 0 | 5, 19, 0, 0 |
| Description | No Add | Add 8% H2O | Add 20% CO2 | Add 5 wt % H2O; 18 wt % CO2 | Add 5 wt % H20; 19 wt % CO2 |
| Summary |  |  |  |  |  |
| Total Organic Input (tonnes/day) | 408.5 | 448.5 | 508.5 | 523.5 | 528.5 |
| Liquid HC Output (50/50 Diesel/Naphtha) | 69.8 | 83.0 | 96.7 | 101.8 | 102.8 |
| Water or Steam Product Output | 60.1 | 115.0 | 90.4 | 122.6 | 123.6 |
| Wax Product Output | 52.7 | 62.6 | 73.0 | 76.8 | 77.5 |
| Mixed Alcohol Product Output | 6.6 | 7.9 | 9.2 | 9.6 | 9.7 |
| CO2 Output | 246.6 | 187.2 | 324.7 | 277.9 | 282.7 |
| Net CO2 Output | 246.6 | 187.2 | 224.7 | 187.9 | 187.7 |
| Other Tail Gases: H2 (& CO from H stealing O to H2O) | 58.1 | 22.0 | 21.1 | 2.7 | 1.6 |
| Other Unknown (to balance excess O2 backoff) | −85.4 | −29.2 | −106.7 | −67.9 | −69.5 |
| METSIM H_Required (kCal/hr) for 100 kg/hr of MSW | 146832 | 179761 | 168736 | 197208 | 198483 |
| H_Required (MW) for 500 tpd | 35.6 | 43.5 | 40.9 | 47.7 | 48.1 |
| TLF for 500 tpd (TPD) | 129.1 | 153.5 | 178.9 | 188.3 | 190.0 |
| TLF Gal/yr at SG =1 (gal/yr) | 11,776,528 | 14,005,057 | 16,324,044 | 17,183,140 | 17,342,033 |
| Oxygen cost/gal at $400/tonne |  |  |  |  |  |
| Electricity cost/gal for H_Req. for TLDF at SG =1 & $0.05/kWh ($/gal) + the Oxygen Cost | $1.84 | $1.54 | $1.48 | $1.48 | $1.48 |
| CH4 in Syngas ((TPD) | 11.47 | 4.40 | 4.22 | 0.53 | 0.32 |
| Rank (1 is highest rank) and Comment | Starter | Tester | OK | Hi TLDF | Hi TLDF |
| High Yield |  | Not bad | 10 | 2 | 2 |
| High CO2 recycle |  |  | 1 | 3 | 2 |
| Low cost/gal (best about the same) |  |  | 2 | 2 | 2 |
| Simplicity |  |  | 1 | 2 | 2 |
| CH4 in Syngas |  |  | 3 | 2 | 2 |
| Diesel C-Conversion Efficiency = C-TLDF/C-MSW | 41% | 60% | 59% | 69% | 69% |
| Total C-Conversion Efficiency = C-TLF/C-MSW | 57% | 68% | 80% | 84% | 84% |

Liquid fuel product results for different Additives for 500 tpd MSW Plant: Summaries

| Run Label | G6 | Q | D | F2 |
|---|---|---|---|---|
| Run ID | 7/18/0/0 | 8/15/5/0 | Pure O2 | Some O2 |
| Additives in wt % of MSW (H2O, CO2, CH4, O2) | 7, 18, 0, 0 | 8, 15, 5, 0 | 0, 0, 0, 7 | 4, 12, 0, 3 |
| Description | Add 7 wt % H2O; 18 WT % co2 | Add 8 wt % H2O; 15 wt % CO2, 5 wt % CH4 | Add 7 wt % O2 | Add 4 wt % H2O; 12 wt % CO2; 3 wt % O2 |
| Summary |  |  |  |  |
| Total Organic Input (tonnes/day) | 533.5 | 548.5 | 408.5 | 488.5 |
| Liquid HC Output (50/50 Diesel/Naphtha) | 101.7 | 103.1 | 76.3 | 94.8 |
| Water or Steam Product Output | 132.5 | 137.9 | 87.0 | 117.8 |
| Wax Product Output | 76.8 | 77.8 | 57.5 | 71.5 |
| Mixed Alcohol Product Output | 9.6 | 9.8 | 7.2 | 9.0 |
| CO2 Output | 271.4 | 244.8 | 217.7 | 249.7 |
| Net CO2 Output | 181.4 | 169.8 | 217.7 | 189.7 |
| Other Tail Gases: H2 (& CO from H stealing O to H2O) | 0.4 | 19.7 | 20.7 | 2.8 |
| Other Unknown (to balance excess O2 backoff) | −58.9 | −44.6 | −58.0 | −57.1 |
| METSIM H_Required (kCal/hr) for 100 kg/hr of MSW | 200251 | 209562 | 146075 | 182930 |
| H_Required (MW) for 500 tpd | 48.5 | 50.7 | 35.4 | 44.3 |

TABLE 2B-continued

| | | | | |
|---|---|---|---|---|
| TLF for 500 tpd (TPD) | 188.1 | 190.7 | 141.1 | 175.4 |
| TLF Gal/yr at SG =1 (gal/yr) | 17,167,282 | 17,397,251 | 12,871,869 | 16,002,438 |
| Oxygen cost/gal at $400/tonne | | | $0.49 | $0.16 |
| Electricity cost/gal for H_Req. for TLDF at SG =1 & $0.05/kWh ($/gal) + the Oxygen Cost | $1.47 | $1.47 | $1.98 | $1.61 |
| CH4 in Syngas ((TPD) | 0.08 | 3.95 | 4.49 | 0.57 |
| Rank (1 is highest rank) and Comment | Hi TLDF | Hi TLDF | Poor | Hi cost |
| High Yield | 2 | 1 | 10 | 3 |
| High CO2 recycle | 3 | 4 | 10 | 5 |
| Low cost/gal (best about the same) | 1 | 1 | 9 | 3 |
| Simplicity | 2 | 3 | 1 | 3 |
| CH4 in Syngas | 1 | 3 | 3 | 2 |
| Diesel C-Conversion Efficiency = C-TLDF/C-MSW | 70% | 74% | 51% | 65% |
| Total C-Conversion Efficiency = C-TLF/C-MSW | 84% | 85% | 63% | 78% |

If CH4 is available from the tail gas recycling, the impact is insignificant. The cost of pure oxygen addition is similar to other costs, but then less CO2 (as the oxygen source) can be recycled and total yield is reduced. Of significance is that a variation of the additive wt % for the optimum case of 20% does not change the yield significantly. This suggests a very robust compositional variation for the present embodiment.

Detailed calculations of heat exchanger geometries and pipe sizes required, fluid heat transfer coefficients, and overall heat transfer coefficients between the syngas and the coolants to determine the temperatures available (or required to/from turbines) were made. Banks of heat exchangers for each syngas-coolant were set up in columns of variable diameter pipe rows determined as above. The banks were sequenced by trial and error to give the optimum arrangement to satisfy the desired criteria: maximum temperatures of additives into the SAF, maximum turbine power for the pressures dictated by the FTP used, and an appropriate temperature differential between the syngas and the coolant in the heat exchangers, as well as the need to have the most rapid cooling most upstream for quenching the syngas to prevent the reformation of complex hydrocarbons. These spreadsheet calculations were then verified via an ASPEN software calculation (M. McKellar, et al., Aspen Process Model for the Misty Mountain Resource Recovery Plant, INL TAP Report INL/LTD-15-36850, October 2015).

Results for Example Case

A more complex arrangement than FIG. 2 occurs for the 500 tpd MSW plant for which three (3) FTP waste CO2 flows of 95 tpd each, were determined. One CO2 flow 45 feeds the SAF along with a water/steam 51 reuse as is shown in FIG. 2 and listed in Table 3. The varied pattern of the coolants of the syngas is apparent in the list of temperatures. HX1 17 is the first heat exchanger the Syngas sees, and so forth. The Descriptions indicate the use of the coolant being heated. HP is high pressure, MP is medium pressure, LP is low pressure, GT is gas turbine, and ST is steam turbine.

The order and temperatures for the heat exchangers (HX) so numbered and described are given in Table 3. The component numbers as shown in FIG. 2 are given in front of the HX designation in Tables 3, 4 and 5. NA denotes those not explicitly shown in FIG. 2. The conditions selected are to obtain maximum temperatures of the recycled additives to the SAF and the most electrical power to reduce the net power needed.

TABLE 3

Order, description and temperatures over heat exchangers for the example.
The leaving syngas temperature is the next syngas inlet temperature.

| Heat Exchanger | Description | T_syngas_in (C) | T_CO2_in (C) | T_CO2_out (C) |
|---|---|---|---|---|
| 17 HX1 | CO2 1$^{st}$ Cycle to SAF at LP | 900.0 | 528.3 | 799.0 |
| 19 HX2 | CO2 1$^{st}$ Cycle Reheat at MP to GT1 | 872.7 | 535.5 | 700.0 |
| 21 HX3 | CO2 1$^{st}$ Cycle Heat at HP to GT2 | 856.7 | 200.0 | 700.0 |
| NA HX4 | CO2 2$^{nd}$ Cycle Reheat at MP to GT3 | 808.9 | 535.5 | 700.0 |
| NA HX5 | CO2 2$^{nd}$ Cycle Heat at HP to GT4 | 792.3 | 200.0 | 700.0 |
| NA HX6 | CO2 3$^{rd}$ Cycle Reheat at MP to GT5 | 744.5 | 563.4 | 700.0 |
| NA HX7 | CO2 3$^{rd}$ Cycle Heat at HP to GT6 | 730.5 | 200.0 | 700.0 |
| 22 HX8 | H2O to SAF (Bled off ST2) | 682.2 | 244.7 | 590.0 |
| 26 HX9 | H2O to ST1 and ST2 | 665.7 | 200.0 | 600.0 |
| 27 HX10 | H2O to ST3 (separate Rankine cycle) | 566.0 | 150.0 | 500.0 |

Table 3 lists three CO2 Gas cycles, but FIG. 2 shows only one. That is because there is 3 times as much CO2 available from the FTP as needed for the additive. Therefore, three CO2 Brayton gas cycles each with one reheat stage were set up identically, except for the 1$^{st}$ cycle, after which gas turbine GT1 18 the CO2 is reheated in GT1 17 and routed 6 to the SAF 8. As a result, each gas cycle has entering CO2 from the FTP 45 at 200 C and 15 atm, as well as any excess CO2 36 not used by the feeder assembly 7 (not shown). The syngas 16 heats the CO2 45 up to 700 C in HX3 21 to enter the high pressure turbine 20. The steam 51 is not heated to as high a temperature and therefore is located at the end of the syngas heat exchanger chain.

An alternative for HX1 17 is to use a water-wall unit first to cool the syngas. It is also possible to rearrange the order of the coolant heat exchangers to get higher temperature syngas to transfer heat to higher temperature coolants, but the simpler configuration in FIG. 2 is easier to understand.

Table 4 indicates the mass flow rates, pressures, temperatures and electrical power output for the CO2 powered turbines. The six CO2 turbine systems of the three CO2 flows of 95 tpd are set up to operate identically except for the exhaust of GT1 18, which CO2 6 has been heated in HX1 17 to be added to the SAF 8. The exhaust from GT3 ~18 and GT5 ~18 are at 528.3 C which can be used to heat additional rankine cycles, help boil the FT liquid water or other waste heat activities. The pressure is too low (~1 atm) to use in a turbine directly.

TABLE 4

Selected thermal properties of the CO2 turbine processes and power developed.

| Turbine System | Mass Flow (tpd) | p_in (kPa) | p_out (kPa) | T_in (C) | T_out (C) | Power (MWt) |
|---|---|---|---|---|---|---|
| 18 GT1 | 95 | 397.2 | 101.3 | 700 | 528.3 | 0.2235 |
| 20 GT2 | 95 | 1489 | 405.3 | 700 | 535.5 | 0.2143 |
| ~18 GT3 | 95 | 101.3 | 397.2 | 700 | 528.3 | 0.2235 |
| ~20 GT4 | 95 | 1489 | 405.3 | 700 | 535.5 | 0.2143 |
| ~18 GT5 | 95 | 397.2 | 101.3 | 700 | 528.3 | 0.2235 |
| ~20 GT6 | 95 | 1489 | 405.3 | 700 | 563.4 | 0.1786 |
| Total MWe from CO2 | | | | | | 1.2777 |

Table 5 indicates the mass flow rates, pressures, temperatures and electrical power output for the H2O powered turbines 23 & 28. Only 25 tpd is needed for the additive H2O 5 of the 125 tpd available. It is obtained by reheating part of the steam run through ST2 23 to 590 C before injecting the steam 5 into the SAF 8. Each of the turbines has a different flow rate because the steam heating is balanced to the syngas energy available.

TABLE 5

Selected thermal properties of the steam turbine processes and the power developed.

| Turbine System | Mass Flow (tpd) | p_in (kPa) | p_out (kPa) | T_in (C) | T_out (C) | Power (MWt) |
|---|---|---|---|---|---|---|
| 23 ST1 | 100 | 101.3 | 34.47 | 244.7 | 156.7 | 0.1968 |
| 23 ST2 | 125 | 1489 | 101.3 | 600 | 244.7 | 1.057 |
| 28 ST3 | 134.5 | 1460 | 34.47 | 500 | 93.09 | 1.247 |
| Total MWe from H2O | | | | | | 2.498 |

There is more than double the power generated by the steam-Rankine cycles at much lower temperatures than by the CO2-Gas/Brayton cycles. The difference is caused by a combination of the greater change in temperature and higher mass flow rates in the steam cycles.

Following the last heat exchanger 27, conventional air pollution control equipment is used as the syngas primary clean-up system. The syngas 16-B is cooled to approximately 200 C prior to the filter baghouse 33 Syngas particulate 53 is collected from the filter baghouse 32 with the particulate (mostly silica) returned to the SAF feeder 7. The syngas acid gas is then scrubbed out by a scrubber 33. The syngas 16-B is further cooled in the scrubber to approximately 50 C. This energy is used to help boil the compressed water for HX10 27. A separate cooler 54 is used to maintain scrubber temperatures. The scrubber blowdown 55 is evaporated to retrieve acid salts. The syngas 16-C is then compressed to 15 atm for this example by a compressor 56 and stored temporarily in tanks 57 for input to the FTP 52.

A simple FT synthesis and refinery plant 52 outlined in FIG. 2 is included to show the sources of the additives CO2 6 and H2O 5. The compressed syngas 16-D flows into a Rectisol™ or equivalent S-cleanup system 34 that separates it into three streams. The top stream contains H2S and CO2 which are processed in a Sulfolin™ or equivalent S-recovery process 35 to separate any sulfur 37 and CO2 36. CO2 36 provides a blanket gas to the feeder 7 in order to reduce the air and nitrogen in the void spaces. Any excess CO2 from the blanket gas is blended with CO2 51 from the FT refinery 48.

The middle stream from S-cleanup 34 contains the liquid naphtha that goes to a naphtha liquid refinery 38 to generate chemicals 39 and fuels 40.

The third stream of clean syngas enters the FT catalytic synthesis process 41. The syngas is further separated into gases 42, oil product and waxes 46, and aqueous product including alcohols 47. The latter two are processed in a FT refinery 48 to make chemicals 49 and fuels 50 and to generate the waste water 51 that is recycled through HX9 26 to the steam turbine ST2/1 23 cycle with the take off to SAF 8 as steam additive 5. The gas products 42 from the FTS process go to a Benfield CO2 separation unit 43 where CO2 45 is separated from tail gas 44 of any remaining CO, H2, CH4, N2, etc. The CO2 45 is routed to the HX3 21, and its sisters HX5 and HX7 ~21. The tail gas 44 can be recycled back into the FTS 41, as often done to improve conversion efficiency, or it can be recycled into the SAF 8 with the CO2 6. In the latter case, there is no reason to include the Benfield process. The recycling of the tail gas 44 to the FTS 41 will depend on the commercial FTS process selected. If the tail gas quantity is small and its composition is not principally CO and H2, then it can be recycled back into the SAF 8. Excessive nitrogen can be culled out. If CH4 concentrations are high in the tailgas, it can be used to generate more electric power.

Table 6 is a summary of the heat use and recovery by various components. The energy to melt the metal and slag is a small fraction of the energy to gasify. That is why the economics of metal recovery and casting of the molten slag from the inorganics is more favorable than making electricity or liquid fuels from the organics. The energy added by the additives is misleading because it is their mass enthalpy added to the syngas that counts in addition to that which came from the syngas and that from the FTP. The HX heating is meaningful in that there is a double savings because one does not then have to heat the Additives by that much to get the desired syngas composition.

The results show that the CO2 additive can be heated to ~800 C and the H2O additive heated to ~590 C, while recycling the energy available from FT synthesis and syngas cooling. In addition, approximately 5 MWe power are generated to reduce the external electricity needed by the SAF.

TABLE 6

Summary of the heat required and recovered by various components (component heat losses are included).

| Component | MW |
|---|---|
| SAF - metal & slag melting | 0.71 |
| SAF pyrolization/gasification | 42.10 |
| SAF-gasifier heating of additive CO2 & H2O | 4.90 |
| Total provided through SAF power | 47.71 |
| CO2 turbine power cogeneration | −1.28 |
| H2O turbine power cogeneration | −2.50 |
| Net electrical energy required by SAF | 43.93 |
| Energy recovered by reheating additives | |
| CO2 in HX1 (included above) | 0.36 |
| H2O in HX8 (included above) | 0.21 |
| Waste heat from FTS, CO2 exhaust or other to heat water to 150 C. for separate Rankine Cycle | 0.56 |

In addition to energy savings, the embodiment reduces the carbon footprint by recycling the CO2 into the SAF. Miglio, Zennaro and de Klerk (Ibid., Environmental Sustainability chapter, p 329) present the CO2 footprint due to the raw material feed. Several of their raw materials relevant to this work are shown in Table 7. The effective H:C ratios are not well explained but apparently are caused by the hydrogen being used for the hydrogenation of heteroatoms, thus reducing the hydrogen that is effective.

TABLE 7

Comparison of the CO2 footprint from various materials and sources.

| Feed Material | H:C Ratio | | CO2 footprint | Source |
|---|---|---|---|---|
| | Nominal | Effective | due to Feed (kg CO2/KG HC) | |
| Natural gas (CH4) | 4.00 | 4.00 | 0.00 | Miglio, et al. |
| MSW refuse | 1.83 | 0.65 | 3.96 | " |
| Biomass-switchgrass | 1.45 | 0.12 | 5.75 | " |
| Coal-Ill#6 bituminous | 0.77 | 0.43 | 4.60 | " |
| MSW-EPA 2012 | 1.67 | 0.59 | 4.34 − 1.45 = 2.89 net | This work |

Table 7 indicates that the carbon footprint of a typical Waste-to-energy plant processing of MSW is approximately 3.96 kg-CO2/kg-HC. Prorating this work to their MSW reference work gives an effective H:C of 0.59 and a footprint of 4.34. Their discussion indicates that the FTP does not affect the CO2 footprint significantly compared to the overall footprint. For the present example, the recycled CO2 is approximately 33% of the total CO2 generation or 1.45 kg-CO2/kg-HC. Subtracting that from the 4.34 gives 2.89 kg-CO2/kg-HC. In this calculation, the CO2 contribution of the electric power plant has not been taken into account, but there is a reduction in the CO2 footprint of the SAF-FTP systems of 33%.

Economic considerations of the cost of electricity is often used to discard consideration of electric arc processing, prematurely. The convenience of SAF gasification to a relatively pure syngas with high carbon-efficiency, the ability to process heterogeneous MSW compositions easily with a concentrated energy source, the generation of a separate homogeneous molten "slag" from which high-value construction products can be cast, and the recycle ability of FTP waste CO2 and H2O to decrease the carbon footprint and amount of waste water overcome the initial electrical prejudices. These factors contribute to the bottom line, showing the economics favors the novelty of the SAF gasification process as presented here.

CONCLUSIONS, RAMIFICATIONS AND SCOPE

The embodiment is the linking of a liquid fuels synthesis process, such as a Fischer-Tropsch synthesis and refinery system, to an electric furnace process, such as a submerged arc furnace to increase liquid hydrocarbon product yield, decrease electrical costs, decrease the carbon footprint of the combined systems, and to be able to process MSW, biomass, and coal effectively (which without additives give H2/CO molar ratios of less than unity). The electrical process can be done without having to force the syngas H2/CO molar ratio greater than 2, as done with partial oxidation methods.

The advantages of the novelty of the present embodiment is that by linking an electric gasification process with the CO2 and H2O effluent waste products from the FT synthesis process:
1) essentially no sorting of the MSW to separate inorganics and metal is required.
2) less external electric energy is required,
3) the yield of liquid fuels is increased over that from the original organic feedstock because the addition of the waste CO2 from the FTP increases the CO syngas content,
4) the footprint of CO2 from the FT process is significantly smaller than if CO2 is not recycled,
5) The syngas cooling can be transferred to the FT process waste CO2 & H2O at high pressure to increase the electric power that can be cogenerated to reduce overall electrical consumption.
6) the addition of pure oxygen is not required, and
7) the amount of steam added is reduced from the traditional formulation.

The Ramifications of the embodiment are to extend electric arc furnace processing of MSW and C&D waste to generate liquid fuels and chemicals, and to help eliminate distribution of said waste to landfills and the associated liabilities.

The scope of the application is world wide, to collected MSW and to mine landfill MSW, to construction and demolition waste, and to biomass waste. The application can be applied to alcohol synthesis systems as well as FTP, and thereby can be used to generate a wide range of fuels and chemicals.

A major caveat to obtain the above conclusions, is that the syngas generation system must be able to accept and utilize the recycled FTP CO2 and H2O effluents in concert with a heterogeneous feedstock in an appropriate manner. The graphite-electrode arc melter operating in the submerged arc furnace (SAF) model has the advantages required to optimize the generation of the syngas, as well as to separate and process the inorganic and metallic materials usually associated with the types of waste materials to be converted, namely, municipal solid waste, construction and demolition waste, medical waste, and biomass.

This embodiment has not been proposed by others previously because one must use the appropriate apparatus, couple the syngas generation and FTP systems in a novel manner, and devise the complex process procedures to optimize the task economically.

We claim:
1. A method of preparing liquid fuels from syngas, comprising:
   a) providing a waste conversion reactor having a decomposition chamber wherein waste materials comprising organic and inorganic waste is pyrolyzed to produce a high temperature syngas from said organic material and slag from decomposition of said inorganic waste; said waste conversion reactor comprising a submerged arc furnace or plasma torch furnace which supplies heat to the decomposition chamber for pyrolysis and decomposition of said organic and inorganic waste materials;
   b) introducing said syngas from step a) to a liquid fuel synthesis system comprising one or more synfuel conversion reactors wherein said syngas is converted into liquid fuel, wherein said synfuel conversion reactors comprises a syngas conversion catalyst; said synfuel conversion reactor operating at a lower temperature than the temperature of syngas exiting the waste conversion reactor, and wherein at least one of said synfuel conversion reactors provides an effluent stream comprising water, carbon dioxide, tail gas or mixtures thereof;

c) heating at least one of the at least one liquid fuel effluent streams by exchanging heat with high temperature syngas stream exiting from said waste conversion reactor thereby producing a cooled syngas stream and a hot effluent stream;

d) introducing the cooled syngas stream into the liquid fuel synthesis plant syngas supply inlet and;

e) introducing at least one hot effluent stream into an inlet of the waste conversion reactor.

2. The method of claim 1, wherein one liquid fuel effluent stream from the liquid fuel synthesis system which exchanges heat with high temperature syngas contains water.

3. The method of claim 1, wherein one liquid fuel effluent stream from the liquid fuel synthesis system which exchanges heat with high temperature syngas contains carbon dioxide.

4. The method of claim 2, further comprising heat exchanging a second liquid fuel effluent stream from the liquid fuel synthesis system comprising carbon dioxide, with high temperature syngas.

5. The method of claim 1, wherein a tail gas effluent stream from the liquid fuel synthesis system is introduced into the waste conversion reactor.

6. The method of claim 1, wherein said hot effluent stream is introduced in turbine to generate power and wherein said effluent stream from said turbine is heat exchange relationship with said high temperature syngas from said waste conversion reactor.

7. The method of claim 1, wherein one or more effluent stream from said synfuel conversion reactor comprising water, carbon dioxide and tail gas is introduced into said waste conversion reactor.

8. The method of claim 6, wherein said power generated from said turbine supplies a portion of the energy required for said submerged arc or plasma arc furnace.

9. The method of claim 1, wherein liquid metal collects in a molten metal zone in the waste conversion reactor below the slag, and the metal is periodically removed.

10. The method of claim 1, wherein the slag is periodically removed from the waste conversion reactor in liquid form.

11. The method of claim 1, wherein the waste materials pyrolyzed in the waste conversion reactor consists essentially of biomass, municipal solid waste, construction, mining waste, and demolition waste, and mixtures thereof.

12. The method of claim 1, wherein said liquid fuel synthesis system comprises least one or more F-T catalytic reactors.

13. The method of claim 1, wherein said liquid fuel synthesis system comprises at least one or more alcohol synthesis reactors.

* * * * *